United States Patent
Channabasavaiah et al.

(10) Patent No.: US 9,754,231 B2
(45) Date of Patent: Sep. 5, 2017

(54) HUMAN TASK INTEGRATION INTO BPEL PROCESS VIA PRESENCE DRIVEN DELIVERY

(75) Inventors: Kishore Channabasavaiah, Palatine, IL (US); Sri Ramanathan, Lutz, FL (US); Matthew B. Trevathan, Kennesaw, GA (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1523 days.

(21) Appl. No.: 12/401,649

(22) Filed: Mar. 11, 2009

(65) Prior Publication Data
US 2010/0235213 A1 Sep. 16, 2010

(51) Int. Cl.
*G06Q 10/00* (2012.01)
*G06Q 10/06* (2012.01)

(52) U.S. Cl.
CPC ..... *G06Q 10/063114* (2013.01); *G06Q 10/06* (2013.01)

(58) Field of Classification Search
USPC .................................. 705/9, 1.1, 7.26, 7.11
See application file for complete search history.

(56) References Cited

U.S. PATENT DOCUMENTS

| | | | |
|---|---|---|---|
| 4,625,081 A * | 11/1986 | Lotito | H04M 3/533 379/196 |
| 7,231,267 B2 | 6/2007 | Bournas et al. | |
| 7,472,378 B2 | 12/2008 | Bennett et al. | |
| 2004/0223485 A1* | 11/2004 | Arellano | H04L 12/581 370/351 |
| 2005/0026600 A1* | 2/2005 | Hymel | H04M 1/274575 455/417 |
| 2006/0143229 A1 | 6/2006 | Bou-Ghannam et al. | |
| 2007/0038493 A1* | 2/2007 | Subrahmonia et al. | 705/8 |
| 2007/0168948 A1 | 7/2007 | Goland | |
| 2007/0174822 A1 | 7/2007 | Moser et al. | |
| 2007/0266377 A1 | 11/2007 | Ivanov | |
| 2008/0098108 A1 | 4/2008 | Yu | |
| 2009/0018983 A1 | 1/2009 | El-Rafei et al. | |

OTHER PUBLICATIONS

Oracle BPEL Process Manager Developers Guide (Jan. 2007). Examiner has attached just the relevant pages, but the full publication can be found here: http://docs.oracle.com/cd/E12483_01/integrate.1013/b28981.pdf.*
Oracle BPEL Process Manager Developers Guide (Jan. 2007). Examiner previously attached relevant pages with previous office actions. The full publication can be found: http://docs.oracle.com/cd/E12483_01/integrate.1013/b28981.pdf.*
Oracle BPEL Process Manager Developers Guide (Jan. 2007).. The full publication can be found: http://docs.oracle.com/cd/E12483_01/integrate.1013/b28981 .pdf.*
Oracle BPEL process manager, Developers Guide Jan. 2007.*

* cited by examiner

*Primary Examiner* — Ig T An
(74) *Attorney, Agent, or Firm* — Maeve M. Carpenter; Maxine L. Barasch; Keohane & D'Alessandro PLLC

(57) ABSTRACT

An approach that provides presence driven notification to a subscriber when a business process automation chain requires manual intervention is provided. In one embodiment, there is a notification tool, including a routing component configured to transmit a message to the subscriber based on data gathered relating to subscriber presence, location and preferences.

16 Claims, 5 Drawing Sheets

US 9,754,231 B2

HUMAN TASK INTEGRATION INTO BPEL PROCESS VIA PRESENCE DRIVEN DELIVERY

FIELD OF THE INVENTION

This invention relates generally to a business process automation system and method and more specifically to providing presence driven notification to a subscriber when a business process automation chain requires manual intervention.

BACKGROUND OF THE INVENTION

Business Process Execution Language (BPEL) is a workflow description language that addresses the need to sequence a series of web service calls to create composite web services. BPEL allows the use of basic rules and data manipulation to support this and is effective at what it does. However, business processes commonly involve people. BPEL was designed for system-to-system interactions, not interactions that involve human beings. Accordingly, it doesn't define mechanisms focused on interacting with people.

In recognition of the fact that BPEL execution chains sometime need humans involved as part of their processing flows, standards activity has been focused on extensions such as BPEL4People and the Task Execution Language (TEL) to cover a broad range of scenarios that involves people within business processes. However, involving humans in these critical business processes poses some real issues with respect to how these tasks can be handled in real life scenarios. There exists a specific need for modifications to the current state of the art for better integration of humans into business process automation chains.

SUMMARY OF THE INVENTION

In one embodiment, there is a method for providing presence driven notification to a subscriber that human interaction is needed in a business automation process chain. In this embodiment, the method comprises monitoring for and receiving a notification communication from the BPEL infrastructure via a Web Services Gateway when an executing BPEL document reaches a stage for executing a service that needs human intervention, performing a presence lookup and location platform lookup, making a routing decision based on the lookups and transmitting a message to a messaging gateway framework that delivers the message to the subscriber, and generating the necessary charging records.

In a second embodiment, there is a computer system for providing presence driven notification to a subscriber that human interaction is needed in a business automation process chain. In this embodiment, the system comprises at least one processing unit and memory operably associated with the at least one processing unit. A notification tool is storable in memory and executable by the at least one processing unit. The notification tool comprises a monitoring component configured to monitor for and receive a notification communication from the BPEL infrastructure via a Web Services Gateway when an executing BPEL document reaches a stage for executing a service that needs human intervention, a lookup component configured to perform a presence lookup and location platform lookup, a routing component configured to make a routing decision based on the lookups and transmit a message to a messaging gateway framework that delivers the message to the subscriber, and a charging component configured to generate the necessary charging records.

In a third embodiment, there is a computer-readable medium storing computer instructions, which when executed, enables a computer system to provide notification to a subscriber that human interaction is needed in a business automation process chain, the computer instructions comprising: monitoring for and receiving a notification communication from the BPEL infrastructure via a Web Services Gateway when an executing BPEL document reaches a stage for executing a service that needs human intervention, performing a presence lookup and location platform lookup, making a routing decision based on the lookups and transmitting a message to a messaging gateway framework that delivers the message to the subscriber, and generating the necessary charging records.

In a fourth embodiment, there is a method for deploying a notification tool for use in a computer system that provides notification to a subscriber that human interaction is needed in a business automation process chain. In this embodiment, a computer infrastructure is provided and is operable to: monitor for and receive a notification communication from the BPEL infrastructure via a Web Services Gateway when an executing BPEL document reaches a stage for executing a service that needs human intervention, perform a presence lookup and location platform lookup, make a routing decision based on the lookups and transmit a message to a messaging gateway framework that delivers the message to the subscriber, and generate the necessary charging records.

Figure 1:
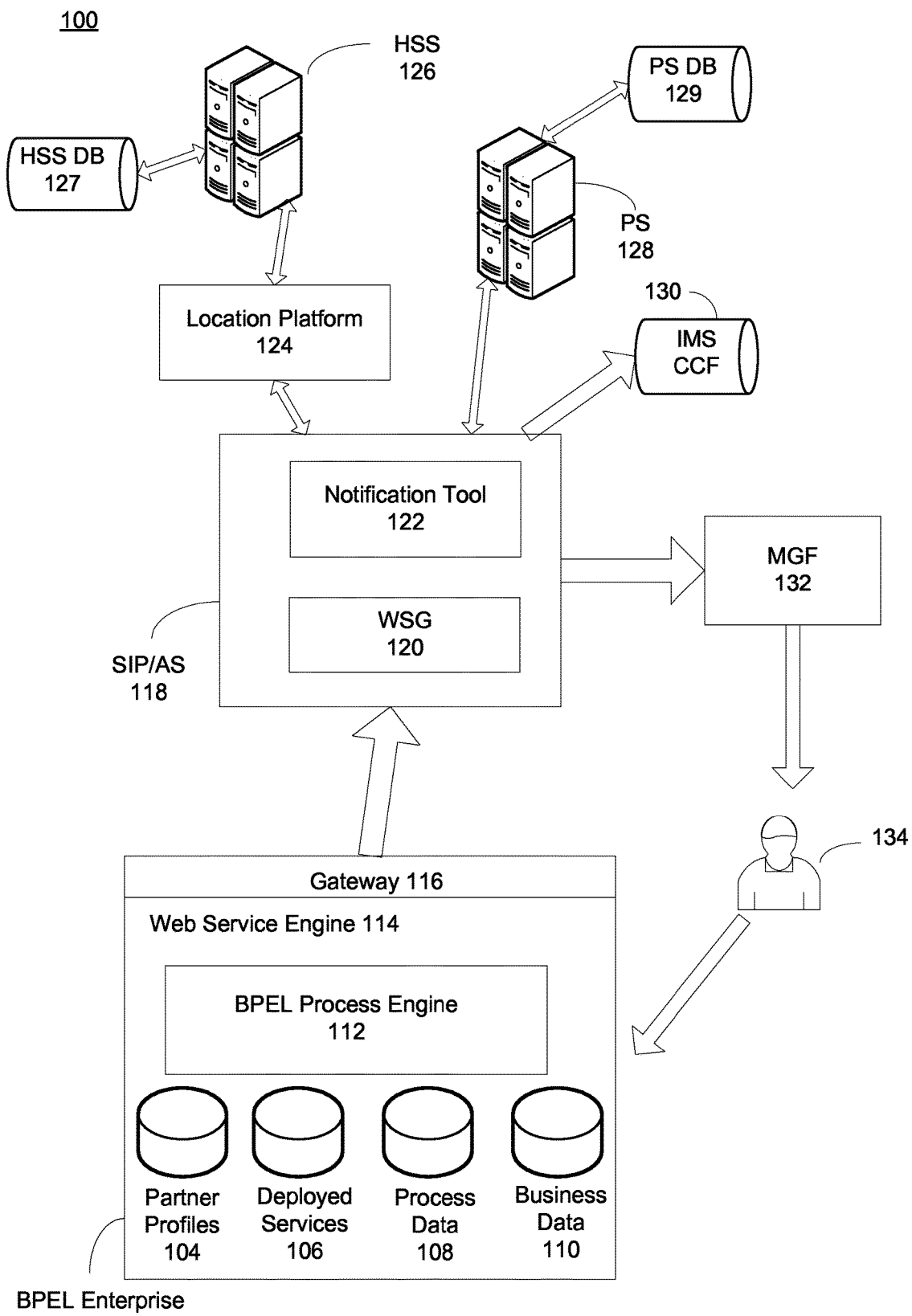
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to providing presence driven notification to a subscriber when an execution flow requires manual intervention. In these embodiments, a notification tool provides this capability. Specifically, a BPEL document deployed inside a BPEL engine executes and a reaches a stage for executing a service that needs human intervention. The BPEL infrastructure sends a notification communication to the notification tool via a Web Services Gateway. The notification tool receives the notification communication and performs lookups to garner presence, location, and preference information relating to the subscriber. A routing decision is made based on the data received from the lookups and a message is sent to the subscriber. The subscriber performs the task and control is handed back to the BPEL execution chain.

FIG. 1 shows a high-level schematic diagram depicting implementation 100 according to one embodiment of this invention in which a service for providing presence driven notification to a subscriber can be utilized. As shown in FIG. 1, BPEL enterprise domain 102 comprises web service engine 114 and gateway 116. Web service engine 114 comprises BPEL process engine 112 and data residing in partner profiles 104, deployed services 106, process data 108, and business data 110. BPEL for web services provides a means to formally specify business processes and interaction protocols. A set of discrete services is assembled into an end-to-end process flow. Web services are deployed inside of a BPEL document and executed by BPEL process engine 112. If BPEL process engine 112 reaches a stage for executing a service that needs human intervention, notification communication from the BPEL infrastructure is sent to a web services gateway (WSG) 120 that is part of the session initiation protocol application server (SIP A/S) 118. WSG 120 is a middleware component that provides an intermediary framework between Internet and intranet environments during web service invocations.

FIG. 1 further depicts SIP/AS 118 within implementation 100. SIP/AS 118 comprises WSG 120 and notification tool 122. SIP/AS 118 receives notification communication that the BPEL process flow requires manual intervention. Notification tool 122 gathers presence information from presence server database 129 via presence server 128. Presence server 128 is a software platform that gathers presence information from multiple providers and then shares it between those providers and any other applications that are interested in it, all in real-time. The data gathered from the providers is stored in presence server database 129. Presence server 128 will rarely be completely sure about the presence of any individual. Presence server 128 can only know about device usage. For example, presence server 128 can know that subscriber 134 has messaging software open on a PC, but it doesn't know for sure that subscriber 134 is at the PC or even in the room unless subscriber 134 just sent a message. It may know that subscriber 134 carries a mobile phone, but it may not know that he/she has it turned on or is able to get a signal. When presence server 128 sends presence information, it is making a judgement based on the information it has by applying availability rules. Having a real-time idea about presence increases the effectiveness of communications and reduces the wait time in getting a response from subscriber 134.

Notification tool 122 also gathers subscriber location and preferences information via location platform 124. Location platform 124 serves as an application gateway in providing location-based services to determine subscriber location. Location platform 124 is also configured to read data from home subscriber server database (HSS DB) 127 via home subscriber server (HSS) 126 relating to subscriber preferences and privacy. Location platform 124 returns location and preferences information to notification tool 122.

Notification tool 122 makes a routing decision based on the information gathered and transmits a message using the selected route via message gateway framework (MGF) 132 to subscriber 134. In an exemplary embodiment, the subscriber role is filled by a person (or persons) capable of performing the task in order to hand back control to the BPEL execution chain. Subscriber 134 may or may not actually pay a fee for the notification service, but is considered a subscriber of the notification service for illustrative purposes. Notification tool 122 also transmits charging information to IP multimedia subsystem charging collector facility (IMS CCF) 130, described in more detail below.

Implementation 100 is intended to represent any type of system that may be implemented in deploying/realizing the teachings recited herein. In this particular example, implementation 100 represents an illustrative system for providing presence driven notification to a subscriber. The components shown in FIG. 1 are only for illustration purposes and those skilled in the art will recognize that there may be different or additional components in implementation 100, but will perform similar functions.

Figure 2:
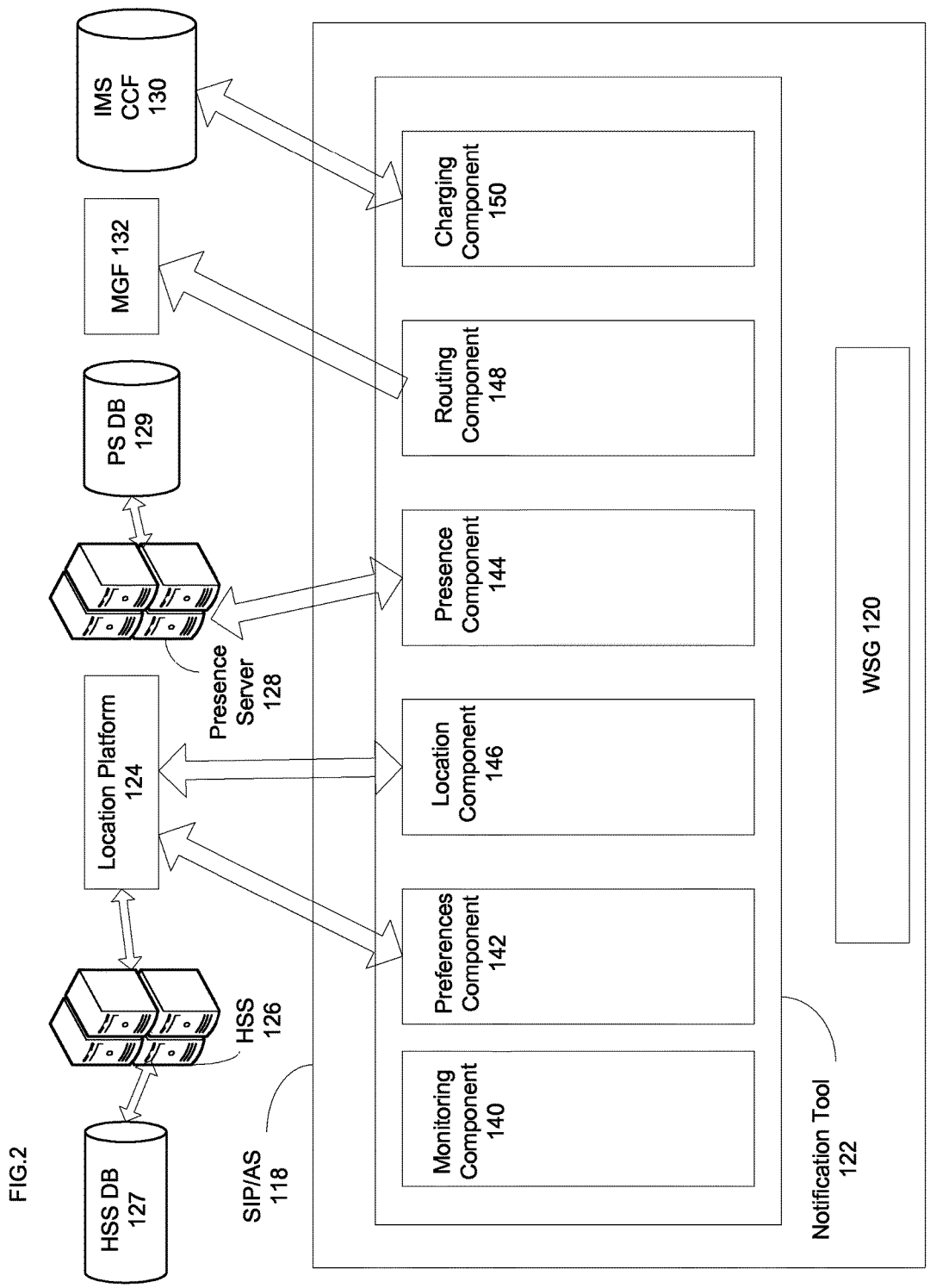
FIG. 2 shows a more detailed view of an exemplary notification tool that operates in the environment shown in FIG. 1.

FIG. 2 shows a more detailed view of an exemplary notification tool 122 shown in FIG. 1 and its interactions with other sources within implementation 100. SIP/AS 118 comprises notification tool 122 and WSG 120. Notification tool 122 comprises monitoring component 140, preferences component 142, location component 144, presence component 146, routing component 148, and charging component 150. Preferences component 142 is configured to perform a location platform 124 lookup to ascertain location and preferences information relating to subscriber 134. Location platform 124 is configured to read subscriber preferences data from HSS DB 127 using HSS 126.

HSS DB 127 houses subscriber preferences information. It may also include a list of subscriber devices and phone numbers. Subscriber preferences may include the device order to be used when attempting to deliver a message to subscriber. Subscriber may also list which device he prefers, depending on his location. For example, if he is away from home, he may specify to contact him via his cell phone or pager. Subscriber preferences may also include whether subscriber wishes to receive only a notification message or would like to receive task information along with notification.

Those skilled in the art will recognize that databases may contain additional information if desired. Databases may be consolidated into a single database or table, divided into multiple database or tables, or clustered into a database system spanning multiple physical and logical devices. Further, although the above information is shown in FIGS. 1 and 2 as being stored in databases, those skilled in the art will recognize that other means of storing information can be utilized.

Routing component 148 analyzes the information gathered relating to subscriber presence, preferences, and location. Based on the analysis, routing component 148 is configured to make a decision of the best route available to transmit a message to subscriber 134. After making the decision, routing component 148 transmits a message to subscriber 134 via MGF 132. MGF 132 is a software gateway that provides routing and message conversion services and is described in more detail below.

Figure 3:
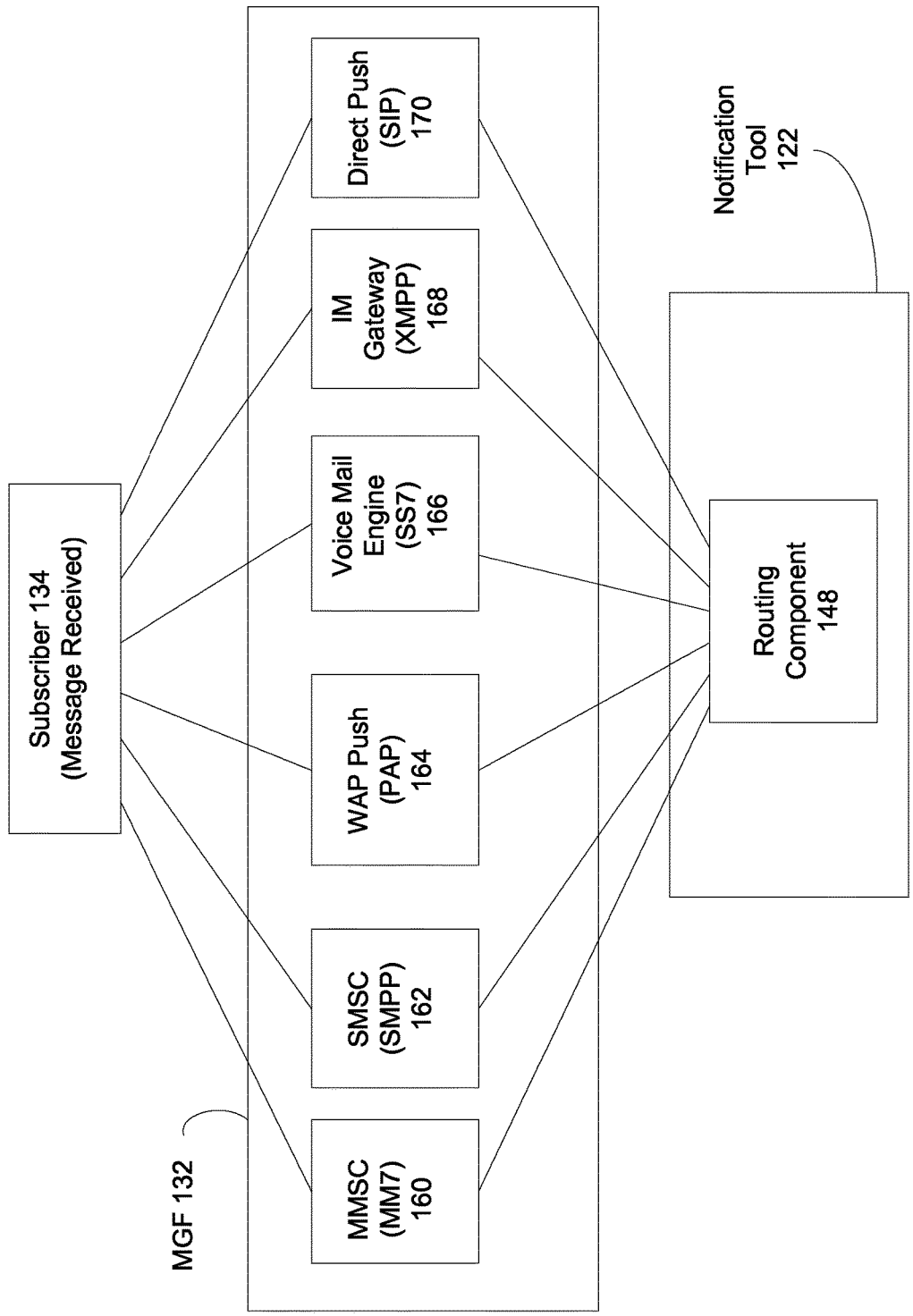
FIG. 3 shows a more detailed view of the messaging gateway framework in FIG. 1.

As shown in FIG. 3, routing component 148 of notification tool 122 makes the decision on the best option for transmitting a message to subscriber 134. MGF 132 provides a plurality of options including MMSC 160, SMSC 162, WAP Push 164, Voice Mail Engine 166, IM Gateway 168, and Direct Push 170. The routing options listed above are only for illustration purposes and those skilled in the art will recognize that there may be different or additional routing options available.

The message may be sent using multimedia service center (MMSC) 160 via MM7. MM7 is the interface between MMSC and a value-added service provider. Another option is to send the message using Short Message Service Center (SMSC) 162 via short message peer-to-peer protocol (SMPP). SMPP is a telecommunications industry protocol for exchanging short message service (SMS) messages. Another option is to use a Wireless Application Protocol (WAP) Push 164 via PAP. A WAP Push is an SMS message which contains a link to a WAP page. When a compatible handset receives a WAP Push message, it allows the user to access that WAP content. Another option is to utilize Voice Mail Engine 166 via Signaling System 7 (SS7). SS7 is a set of telephone signaling protocols. Still another option is to use IM Gateway 168 via an Extensible Messaging and Presence Protocol (XMPP). XMPP is an open technology for real-time communication. Finally, another option is to use Direct Push 170 using SIP. Direct Push 170 provides a wireless email solution.

Subscriber 134 receives the notification message, performs the task, and control is handed back to the BPEL execution chain. Charging component 150 is configured to send charging information to IMS CCF 130. IMS is an architectural framework for delivering internet protocol (IP) multimedia services. IMS includes a definition of the interfaces an application service must use for charging. In the case of offline charging, applied for users who pay for their services periodically, all the SIP network entities involved in the session use the Diameter Rf (protocol) interface to send charging information to a CCF. The CCF is responsible for the IMS domain, carrying the charging information from network nodes to the rating and billing system (not shown).

Figure 4:
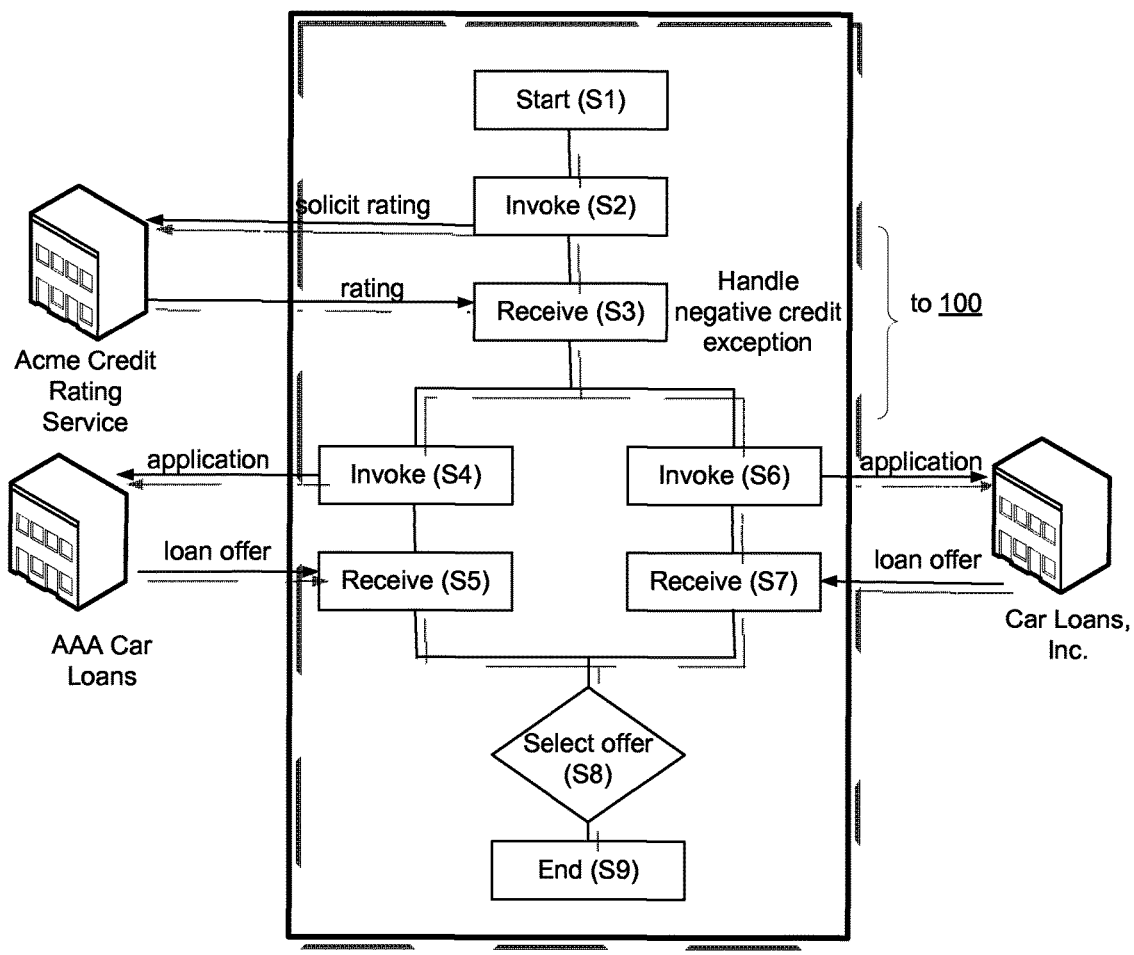
FIG. 4 shows an exemplary embodiment of a BPEL automated process requiring presence driven notification to a subscriber.

In one implementation of the present invention, presence driven notification is depicted in FIG. 4. FIG. 4 details a car loan procurement process. Generally, in this example, the automated loan process works without issue and without the need for human intervention. In step S1, the loan procurement process begins when a person seeking a loan fills out a loan application. As step S2, the person's credit rating is sought from a credit rating service. The rating is received in step S3. If a positive credit rating is received without issue, the remaining steps in the process are executed. The application is sent to two loan companies (steps S4 and S6). Loan offers are received from the loan companies (steps S5 and S7). The best offer is selected in step S8 and the process ends at step S9.

However, if there is an issue with the credit rating, manual intervention is required to determine how to proceed. In this example, subscriber 134, a loan specialist in charge of responding to such issues, is not at his desk and the company requires quick turnaround time in the loan process. Referring back to FIG. 2, a notification communication is sent to SIP/AS 118 as a Web Service. SIP/AS 118 receives the notification communication and SIP/AS 118 determines the best way to notify subscriber 134. To accomplish this, preferences component 142 does a location platform 124 lookup to get subscriber preferences. Location platform 124 accesses HSS DB 127 using HSS 126 to get subscriber profile including subscriber preferences. The lookup shows that subscriber 134 prefers to be contacted via his home phone or cell phone when he is at home and via text message when away from home. His also prefers to receive the notification with task information provided.

Location component 144 does a location platform 124 lookup to ascertain subscriber location. The lookup finds that subscriber 134 is at his home. Presence component 146 does a presence lookup on presence server 128 to determine the channels of communication that are available. The presence lookup yields two important pieces of information: (1) his land line phone at his home is turned on and is not busy on a voice call and (2) his mobile phone is on but is on a data session.

Based on information gathered, routing component 148 determines the best option is to route the message to his home land line via MGF 132. The message is delivered to subscriber 134. Subscriber 134 receives the notification including task information and responds to the loan process issue and control is handed back to the BPEL execution chain.

In one embodiment, notification tool 122 includes charging component 150 that generates the necessary charging records using IMS CCF 130 (FIG. 2). In this case, the telecommunications network described above is leveraged to deliver BPEL interactions to subscribers as a revenue generating service. In this embodiment, the enterprise or a third party service provider could offer subscriber notification as a service by performing the functionalities described herein on a subscription and/or fee basis. In this case, the enterprise or a third party service provider can create, deploy, maintain, support, etc., notification tool 122 that performs the processes described in the invention.

In still another embodiment, the methodologies disclosed herein can be used within a computer system to provide presence driven notification to a subscriber. In this case, notification tool 122 can be provided, and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 5:
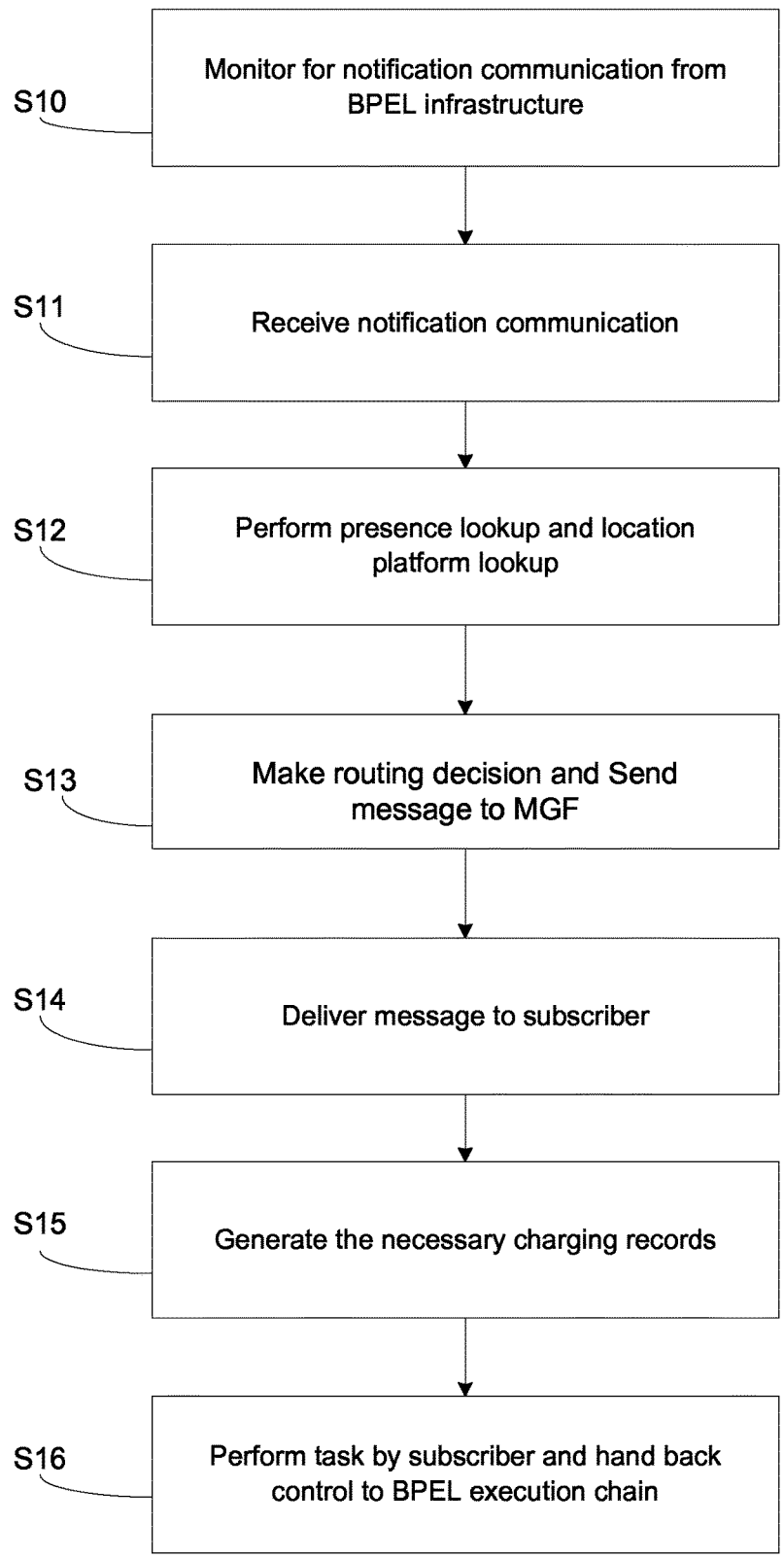
FIG. 5 shows a flow diagram of a process for providing presence driven notification to a subscriber.

FIG. 5 depicts the methodologies disclosed herein. According to one embodiment, in step S10, notification tool 122 monitors for any notification communication from BPEL infrastructure. In S11, a notification communication is received because there is a stage in the BPEL automated process requiring human intervention. In S12, a presence lookup and a location platform looked are performed to determine subscriber presence, location and preferences. In S13, a routing decision is made based on lookups and a message is sent to MGF. In S14, the message is delivered to the subscriber. In S15, any necessary charging records are generated. In S16, the subscriber performs the task and control is handed back to the BPEL execution chain.

The flowchart of FIG. 5 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

An implementation of notification tool 122 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

In another embodiment, the invention provides a business method that performs the process of the invention on a subscription, advertising, and/or fee basis. That is, a service provider, such as a Solution Integrator, could offer to provide the functionality described herein. In this case, the service provider can create, maintain, support, etc., a notification mechanism, such as notification tool 122 (FIG. 1) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method for performing the functionality described herein. In this case, a notification mechanism, such as notification tool 122 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

It is apparent that there has been provided with this invention an approach for providing presence driven notification to a subscriber. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for transmitting a notification message of a business process task to be performed to a person, comprising the computer implemented steps of:
   monitoring an automated business process execution language (BPEL) process flow to determine an instance in which a human action is required;
   monitoring for a notification communication indicating the instance in which a human action is required;
   receiving the notification communication;
   accessing data including presence data related to the person and data associated with the person's preferences from a server database, the person's preferences comprising a pre-specified preferred device communication order and communication type for each of a set of locations;
   making a routing decision based on the data;
   transmitting the notification message relating to a business process task to be performed based on the routing decision to the person; and
   returning control to a BPEL execution chain to resume the automated BPEL process flow following performance of the business process task.

2. The method according to claim 1 wherein accessing data related to the person further includes the computer implemented step of accessing data associated with person's location.

3. The method according to claim 1 wherein the notification message further includes additional, detail information relating to the business process task to be performed.

4. The method according to claim 1 further comprising the computer implemented step of charging a fee for providing a notification message relating to a business process task to be performed to a person.

5. A computer system for transmitting a notification message of a business process task to be performed to a person, comprising:
   at least one processing unit;
   memory operably associated with the at least one processing unit; and a notification tool storable in memory and executable by the at least one processing unit, the notification tool comprising:
- a monitoring component configured to:
  - monitor an automated business process execution language (BPEL) process flow to determine an instance in which a human action is required; and
  - monitor for and receive a notification communication indicating the instance in which a human action is required;
- a presence component configured to access data including presence data related to the person;
- a preferences component configured to access data including presence data related to the person and data associated with the person's preferences from a server database, the person's preferences comprising a pre-specified preferred device communication order and communication type for each of a set of locations; and
- a routing component configured to:
  - make a routing decision based on the data and further configured to transmit the notification message relating to a business process task to be performed to the person based on the routing decision; and
  - returning control to a BPEL execution chain to resume the automated BPEL process flow following performance of the business process task.

6. The computer system according to claim 5 further comprising a location component configured to access data related to the person's location.

7. The computer system according to claim 5, the notification message further including additional, detail information relating to the business process task to be performed.

8. The computer system according to claim 5 further comprising a charging component for charging a notification fee for transmitting a notification message of a business process task to be performed to a person.

9. A computer-readable medium storing computer instructions, which when executed, enables a computer system to transmit a notification message of a business process task to be performed to a person, the computer instructions comprising:
- monitoring an automated business process execution language (BPEL) process flow to determine an instance in which a human action is required
- monitoring for a notification communication indicating the instance in which a human action is required;
- receiving the notification communication;
- accessing data including presence data related to the person and data associated with the person's preferences from a server database, the person's preferences comprising a pre-specified preferred device communication order and communication type for each of a set of locations;
- making a routing decision based on the data;
- transmitting the notification message relating to a business process task to be performed based on the routing decision to the person; and
- returning control to a BPEL execution chain to resume the automated BPEL process flow following performance of the business process task.

10. The computer-readable medium according to claim 9, the accessing of data related to the person further includes accessing data associated with person's location.

11. The computer-readable medium according to claim 9, the notification message further including additional, detail information relating to the business process task to be performed.

12. The computer-readable medium according to claim 9 further comprising instructions for charging a notification fee for providing a notification message of a business process task to be performed to a person.

13. A method for deploying a notification tool for use in a computer system that transmits a notification message of a business process task to be performed to a person, the method comprising:
providing a computer infrastructure operable to:
- monitor an automated business process execution language (BPEL) process flow to determine an instance in which a human action is required;
- monitor for a notification communication indicating the instance in which a human action is required;
- receive the notification communication;
- access data including presence data related to the person and data associated with the person's preferences from a server database, the person's preferences comprising a pre-specified preferred device communication order and communication type for each of a set of locations;
- make a routing decision based on the data;
- transmit the notification message relating to a business process task to be performed based on the routing decision to the person and
- returning control to a BPEL execution chain to resume the automated BPEL process flow following performance of the business process task.

14. The computer infrastructure according to claim 13 further operable to access data related to the person includes accessing data associated with person's location.

15. The computer infrastructure according to claim 13, the notification message further including additional, detail information relating to the business process task to be performed.

16. The computer infrastructure according to claim 13 further operable to charge a notification fee for providing a notification message of a business process task to be performed to a person.

* * * * *